(12) United States Patent
Wang

(10) Patent No.: US 6,502,679 B1
(45) Date of Patent: Jan. 7, 2003

(54) LOW-NOISE LOW-FRICTION RESISTANCE, ONE-WAY DRIVE CAR WHEEL ASSEMBLY

(76) Inventor: Ming Cheng Wang, PO Box 82-144, Taipei (TW)

( * ) Notice: Subject to any disclaimer, the term of this patent is extended or adjusted under 35 U.S.C. 154(b) by 0 days.

(21) Appl. No.: 09/909,947

(22) Filed: Jul. 23, 2001

(51) Int. Cl.$^7$ ............................................. F16D 41/064
(52) U.S. Cl. .......................................... 192/64; 192/45
(58) Field of Search ............................... 192/64, 38, 45, 192/41 R

(56) References Cited

U.S. PATENT DOCUMENTS

| | | | |
|---|---|---|---|
| 2,391,350 A | * 12/1945 | Schmidt ................... | 188/82.84 |
| 3,012,645 A | * 12/1961 | Gensheimer et al. .......... | 192/45 |
| 3,369,638 A | * 2/1968 | Hunt et al. .................... | 192/38 |
| 5,279,400 A | * 1/1994 | Riggle et al. ............. | 188/82.84 |
| 5,579,879 A | * 12/1996 | Hasegawa ................ | 192/109 R |

* cited by examiner

Primary Examiner—Saul Rodriguez
(74) Attorney, Agent, or Firm—Leong C. Lei

(57) ABSTRACT

A low-noise low-friction resistance one-way drive gear wheel assembly includes a gear wheel having tapered recesses radially extended around the inner thereof and supported on a hub, each tapered recess holding a spring-supported ball rack, a first rolling ball, and a second rolling ball in the ball rack for stopping the first rolling ball, the first rolling ball being moved between an engagement position where the gear wheel and the hub are locked for synchronous rotation, and a disengagement position where the hub is freely rotated relative to the gear wheel.

2 Claims, 6 Drawing Sheets

PRIOT ART

LOW-NOISE LOW-FRICTION RESISTANCE, ONE-WAY DRIVE CAR WHEEL ASSEMBLY

BACKGROUND OF THE INVENTION

The present invention relates to a one-way drive gear wheel assembly and, more particularly, to such a one-way gear wheel assembly in which the hub runs idle without producing much noise when the gear wheel is not in the driven status.

In order to save labor, a bicycle is equipped a one-way drive gear wheel, which is mounted on the rear wheel hub and coupled to the chain wheel by a chain. When the bicycle rider propels the pedals in clockwise direction, the one-way drive gear wheel is rotated clockwise, and the rear wheel hub is rotated with the one-way drive gear wheel. When the one-way drive gear wheel is not driven or rotated counter-clockwise, the rear wheel hub is free from the effect of the one-way drive gear wheel and keeps rotating clockwise due to inertia effect. FIG. 6 shows a one-way drive gear wheel assembly constructed according to the prior art for this purpose. This structure of one-way drive gear wheel assembly comprises a gear wheel (sprocket) A, a ratchet wheel B mounted in the inner diameter of the gear wheel A, a plurality of stop elements A1 mounted in the inner diameter of the gear wheel A, a plurality of pivots C1 respectively mounted in the inner diameter of the drive wheel A adjacent to the stop elements A1, a plurality of pawls C respectively pivoted to the pivots C1, and a plurality of torsional springs D respectively mounted on the pivot C1 and stopped between a part of the gear wheel A and the stop elements A1 to force the pawls C into engagement with the sloping teeth B1 of the ratchet wheel B. When rotating the gear wheel A counter-clockwise, the ratchet wheel B is rotated with the gear wheel A counter-clockwise. When stopping the gear wheel A, the ratchet wheel B keeps rotating counter-clockwise due to inertia effect. When rotating the gear wheel A clockwise, the pawls C are moved over the sloping teeth B1 of the ratchet wheel B without carrying the ratchet wheel B, i.e., the gear wheel A runs idle. However, because the pawls C are moved over the sloping teeth B1 of the ratchet wheel B during counter-clockwise rotation of the gear wheel A, much noise is produced.

SUMMARY OF THE INVENTION

It is one object of the present invention to provide a one-way drive gear wheel assembly, which produces less noise during its operation. It is another object of the present invention to provide a one-way drive gear wheel assembly, which produces less friction resistance during its operation. It is still another object of the present invention to provide a one-way drive gear wheel assembly, which automatically forces the hub away from the gear wheel for free rotation when the gear wheel is stopped. According to the present invention, the low-noise low-friction resistance one-way drive gear wheel assembly comprises a gear wheel, the gear wheel comprising an inner diameter, and a plurality of elongated recesses equiangularly spaced around the inner diameter and extended in radial direction, the elongated recesses each having a relatively wider front end, a relatively narrower rear end, and a neck on the middle between said relatively wider front end and the relatively narrower rear end; a hub inserted through the inner diameter of the gear wheel; a plurality of first rolling balls respectively moved in the elongated recesses of the gear wheel between the relatively narrower rear end and neck of each of the elongated recesses of the gear wheel and disposed in contact with the periphery of the hub, the rolling balls having a diameter greater than the width of the neck of each of the elongated recesses of the gear wheel; a plurality of ball racks respectively mounted in the relatively wider front end of each of the elongated recesses of the gear wheel and spaced from the periphery of the hub; a plurality of second rolling balls respectively mounted in the ball racks and peripherally disposed in contact with the periphery of the hub; and a plurality of spring members respectively mounted in the relatively wider front end of each of the elongated recesses of the gear wheel and adapted to support the ball racks and to force the ball racks and the second rolling balls toward the neck of each of the elongated recesses of the gear wheel. When the gear wheel is rotated clockwise, the first rolling balls are moved to the relatively narrower rear end of each of the elongated recesses of the gear wheel forced into engagement between the gear wheel and the hub, thereby causing the hub to be rotated clockwise with the gear wheel. When the gear wheel is stopped, the first rolling balls are forced out of the engagement position between the gear wheel and the hub, enabling the hub to be rotated clockwise relative to the gear wheel.

DETAILED DESCRIPTION OF THE PREFERRED EMBODIMENT

Figure 1:
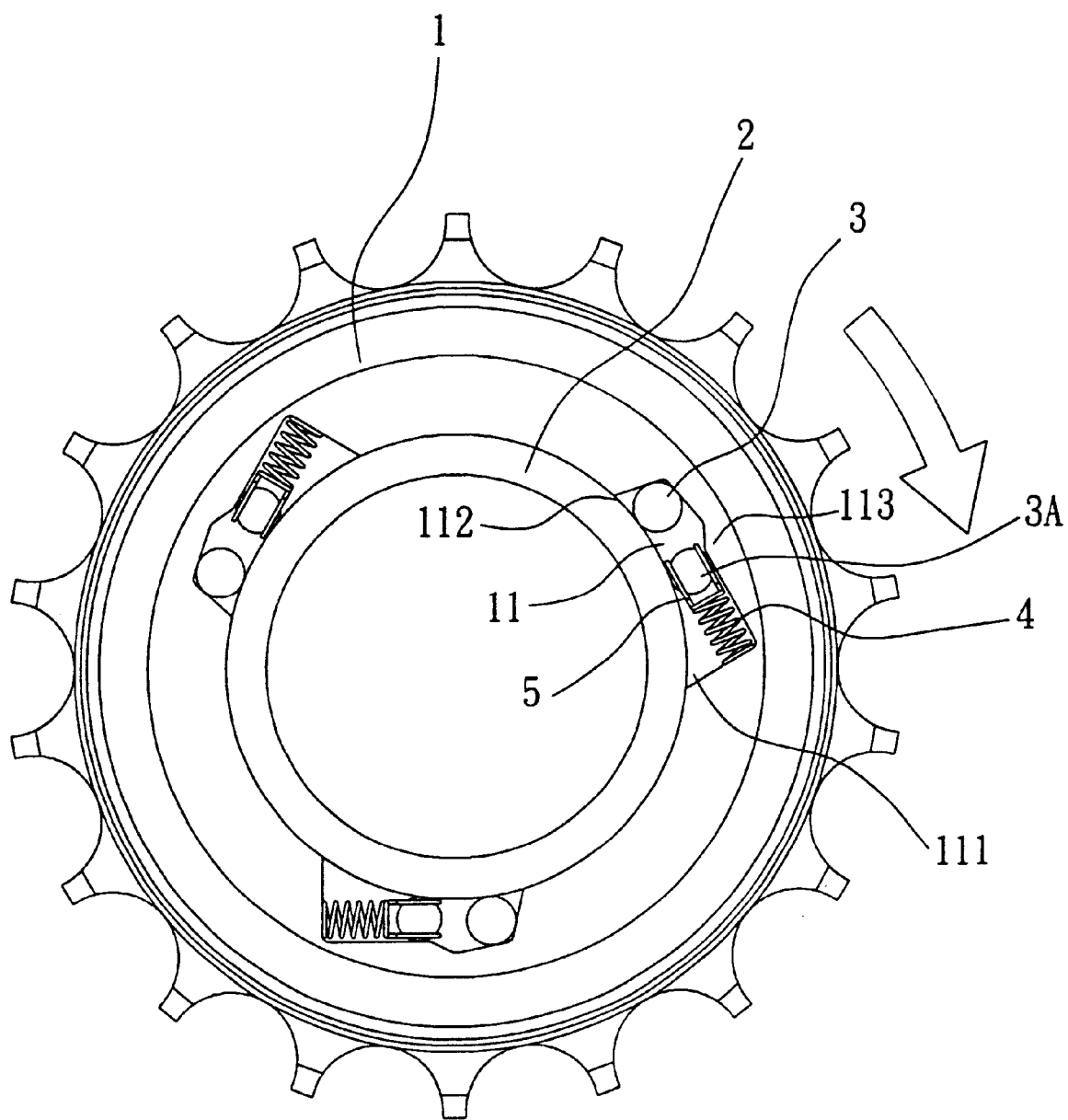
FIG. 1 is a plain view of the present invention, showing the hub rotated with the gear wheel in clockwise direction.
Figure 3:
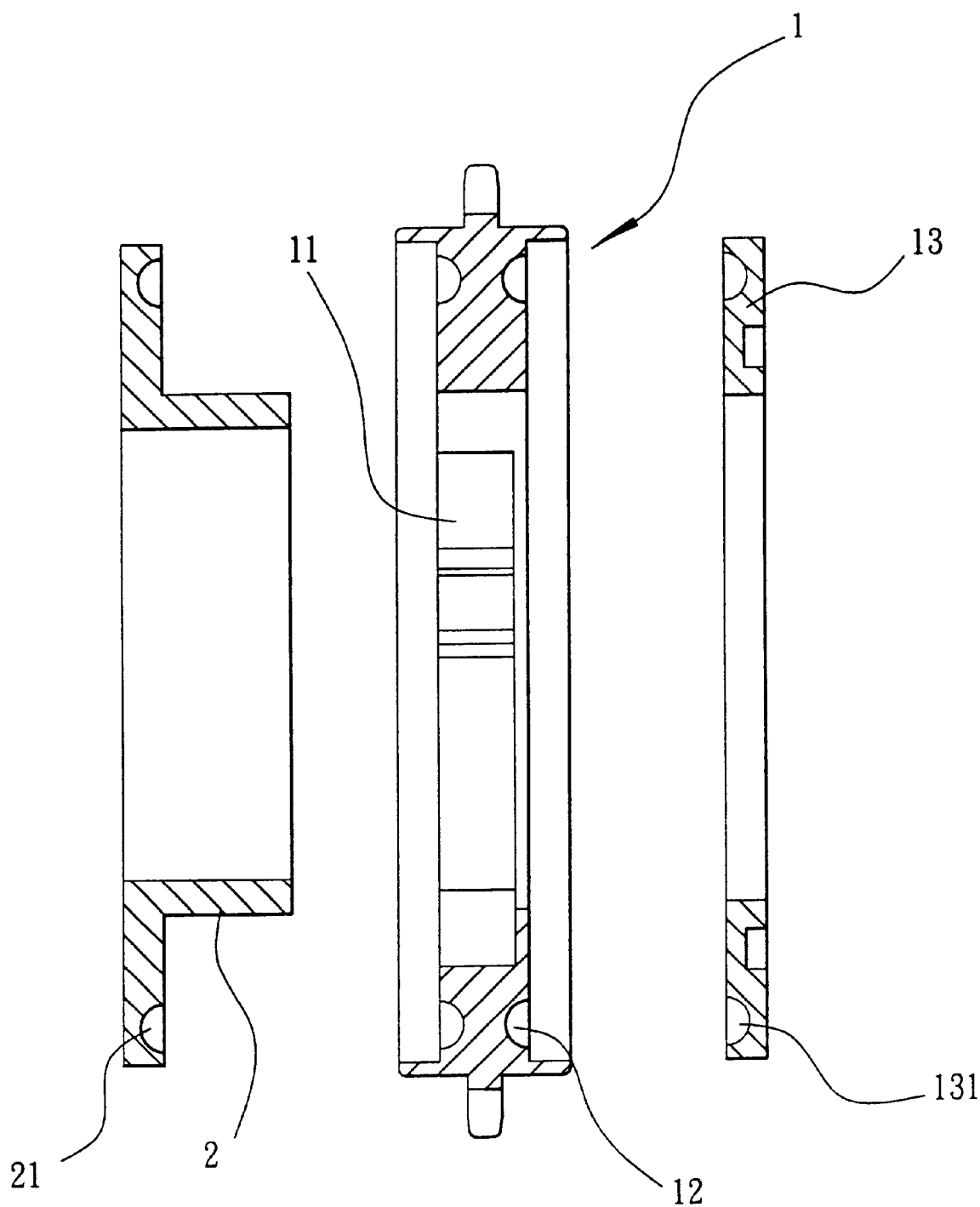
FIG. 3 is a sectional exploded view of the hub, the gear wheel, and the cover plate according to the present invention.
Figure 5:
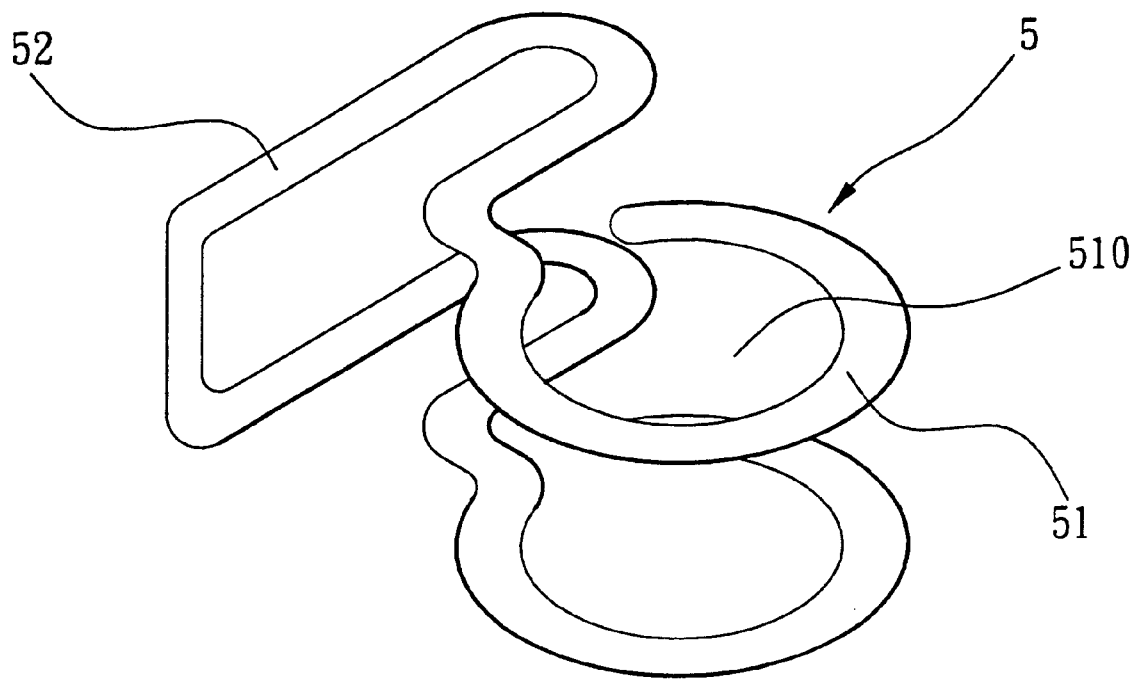
FIG. 5 is an elevational view of a ball rack constructed according to the present invention.
Figure 6:
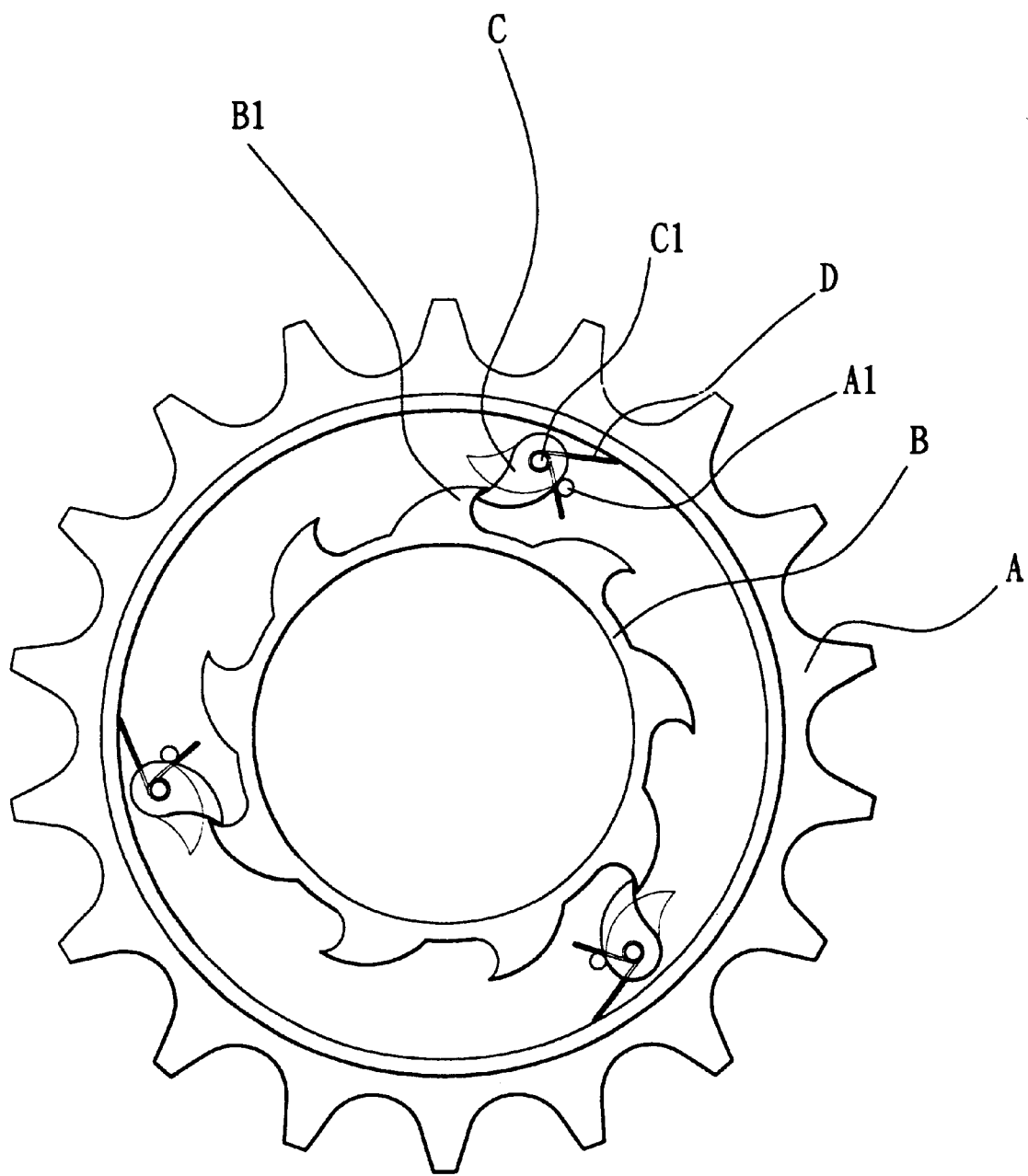
FIG. 6 is a plain view of a one-way drive gear wheel assembly constructed according to the prior art.

Referring to FIGS. 1 and 3, a low-noise low-impedance one-way drive gear wheel assembly in accordance with the present invention is generally comprised of a gear wheel 1, a hub 2, a side cover plate 13, first rolling balls 3, second rolling balls 3A, spring members 4, and ball racks 5. The gear wheel 1 comprises a plurality of elongated recesses 11 equiangularly spaced around the inner diameter thereof and extended in radial direction, and a plurality of semicircular recesses 12 equiangularly disposed in each of the two opposite sidewalls thereof. The elongated recesses 11 each have a wider front end 111, a narrower rear end 112, and a neck 113 on the middle. The width of the neck 113 is shorter than the diameter of the first rolling balls 3. The first rolling balls 3, the second rolling balls 3A, the spring members 4, and the ball racks 5 are arranged in sets respectively installed in the elongated recesses 11, i.e., each elongated recess 11 holds one first rolling ball 3, one second rolling ball 3A, one spring member 4, and one ball rack 5. The first rolling ball 3 is mounted in the narrower rear end 112. Because the diameter of the first rolling ball 3 is greater than the width of the neck 113, the first rolling ball 3 is prohibited from passing through the neck 113. The ball rack 5 is mounted in the wider front end 111 to hold the second rolling ball 3A in the wider front end 111. As shown in FIG. 5, the ball rack 5 is formed of a metal wire rod by bending, comprising at least two parallel open loops 51 and a connecting portion 52 connected between the open loops 51. The open loops 51 define a respective circular hole 510. The second rolling ball 3A is revolvably mounted in the circular hole 510 of each of the open loops 51. The diameter of the second rolling ball 3A is greater than the width of the neck 113. Therefore, the second rolling ball 3A is prohibited from passing through the neck 113. The spring member 4 is mounted in the wider front end 111, imparting a forward pressure to the ball rack 5 and the second rolling ball 3A toward the neck 113.

Figure 4:
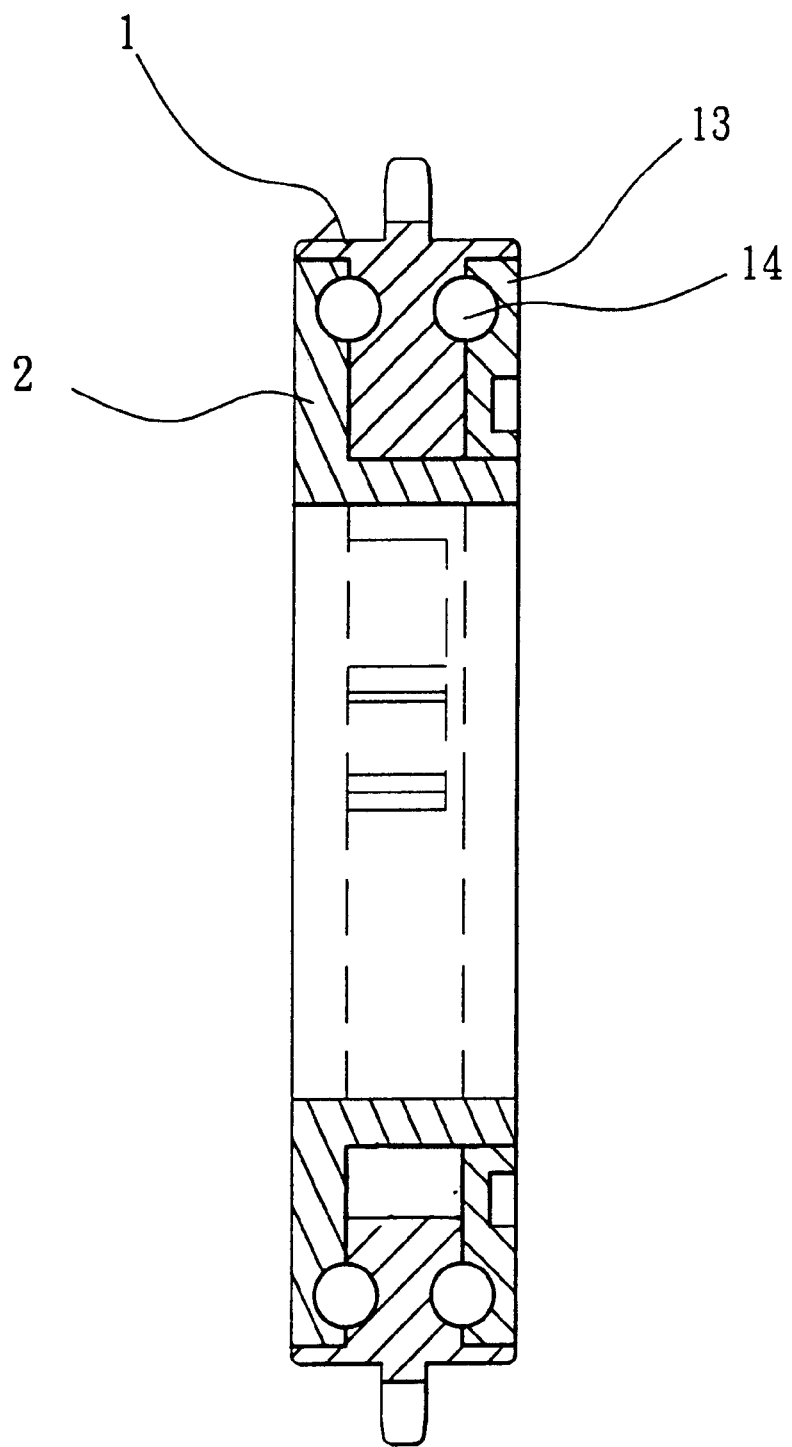
FIG. 4 is a sectional side view of the present invention.

Referring to FIGS. 3 and 4, the hub 2 comprises a plurality of semicircular recesses 21 equiangularly disposed in one sidewall of the outwardly extended peripheral flange thereof corresponding to the semicircular recesses 12 in one sidewall of the gear wheel 1. The side cover plate 13 is a flat plate having a plurality of semicircular recesses 131 equiangularly disposed in one sidewall thereof corresponding to the semicircular recesses 12 in one sidewall of the gear wheel 1. The hub 2 is inserted through the inner diameter of the gear wheel 1 and peripherally disposed in contact with the first rolling balls 3 and the second rolling balls 3A. The cover plate 13 is fastened to one end of the hub 2 to secure the gear wheel 1 to the hub 2. Further rolling balls 14 are respectively mounted in the semicircular recesses 12 in one sidewall of the gear wheel 1 and the semicircular recesses 21 in one sidewall of the outwardly extended peripheral flange of the hub 2, and in the semicircular recesses 12 in the other sidewall of the gear wheel 1 and the semicircular recesses 131 in one sidewall of the side cover plate 13. The installation of the rolling balls 14 greatly reduces friction force between the hub 2 and the gear wheel 1.

When rotating the gear wheel 1 clockwise (see FIG. 1), the elongated recesses 11 are moved with the gear wheel 1 clockwise, and the first rolling balls 3 are respectively moved to the narrower rear end 112 of each of the elongated recesses 11 and engaged in between the inner surface of the gear wheel 1 and the outer surface of the hub 2, thereby causing the hub 2 to be rotated clockwise with the gear wheel 1, and at the same time the second rolling balls 3A are respectively rotated in the neck 113 of each of the elongated recesses 11 due to the effect of the respective spring members 4.

Figure 2:
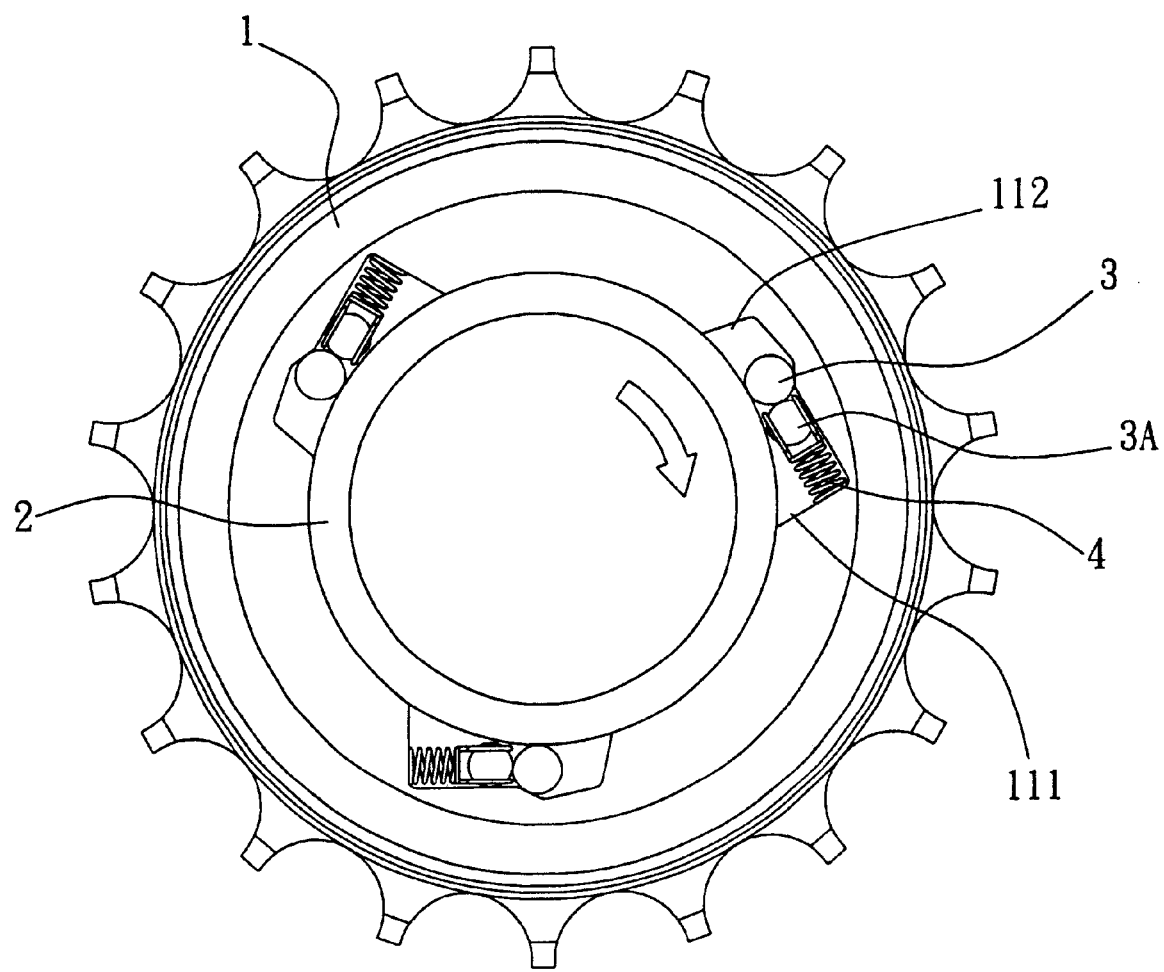
FIG. 2 is another plain view of the present invention, showing the gear wheel stopped, the hub rotated clockwise.

When the gear wheel 1 stopped, as shown in FIG. 2, the hub 2 is continuously rotated clockwise by inertia force or external force, and the first rolling balls 3 are respectively forced by the friction force between the first rolling balls 3 and the hub 2 to move out of the engagement position between the inner surface of the gear wheel 1 and the outer surface of the hub 2 toward the second rolling balls 3A. When the first rolling balls 3 touch the second rolling balls 3A, the spring members 4 absorb the impact, preventing the production of noise. Because the first rolling balls 3 and the second rolling balls 3A are rotated when moved over the surface of the hub 2, less friction resistance is produced, i.e., the user can move the drive gear wheel assembly with less effort.

While only one embodiment of the present invention has been shown and described, it will be understood that various modifications and changes could be made thereunto without departing from the spirit and scope of the invention disclosed.

What the invention claimed is:

1. A low-noise low-friction resistance one-way drive gear wheel assembly comprising:

a gear wheel, said gear wheel comprising an inner diameter, and a plurality of elongated recesses equiangularly spaced around said inner diameter and extended in radial direction, said elongated recesses each having a relatively wider front end, a relatively narrower rear end, and a neck on the middle between said relatively wider front end and said relatively narrower rear end;

a hub inserted through the inner diameter of said gear wheel;

a plurality of first rolling balls respectively moved in said elongated recesses of said gear wheel between the relatively narrower rear end and neck of each of said elongated recesses of said gear wheel and disposed in contact with the periphery of said hub, said rolling balls having a diameter greater than the width of the neck of each of said elongated recesses of said gear wheel;

a plurality of ball racks respectively mounted in the relatively wider front end of each of said elongated recesses of said gear wheel and spaced from the periphery of said hub;

a plurality of second rolling balls respectively mounted in said ball racks and peripherally disposed in contact with the periphery of said hub; and a plurality of spring members respectively mounted in the relatively wider front end of each of said elongated recesses of said gear wheel and adapted to support said ball racks and to force said ball racks and said second rolling balls toward the neck of each of said elongated recesses of said gear wheel;

wherein when said gear wheel is rotated clockwise, said first rolling balls are moved to the relatively narrower rear end of each of said elongated recesses of said gear wheel forced into engagement between said gear wheel and said hub, thereby causing said hub to be rotated clockwise with said gear wheel; when said gear wheel is stopped, said first rolling balls are forced out of the engagement position between said gear wheel and said hub, enabling said hub to be rotated clockwise relative to said gear wheel.

2. The low-noise low-friction resistance one-way drive gear wheel assembly of claim 1 wherein said ball racks are respectively formed of a metal wire rod by bending, each comprising at least two parallel open loops adapted to hold one of said second rolling balls.

* * * * *